June 19, 1934.  J. BROGDEN  1,963,774
BUILDING CONSTRUCTION
Filed June 27, 1931  8 Sheets-Sheet 1
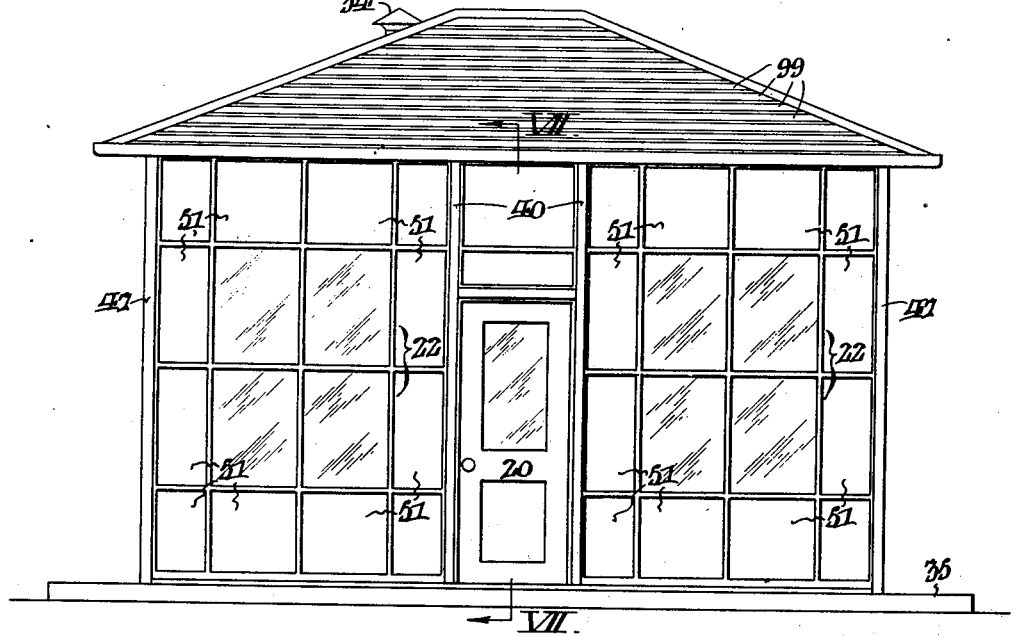
FIG. I.
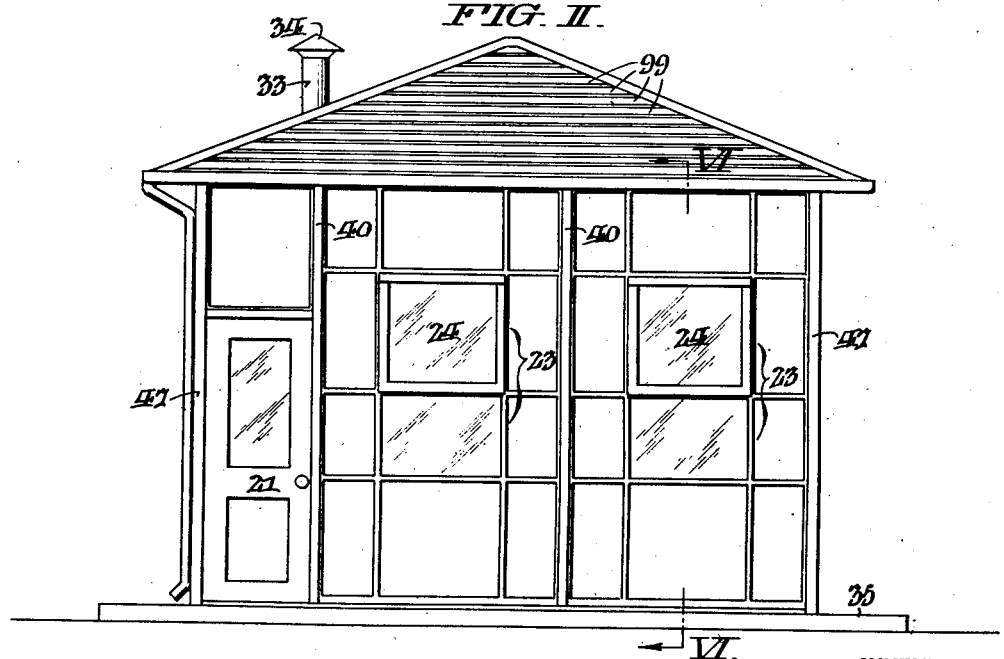
FIG. II.
WITNESSES
INVENTOR.
Joah Brogden
BY
ATTORNEY.

June 19, 1934.  J. BROGDEN  1,963,774
BUILDING CONSTRUCTION
Filed June 27, 1931  8 Sheets-Sheet 2
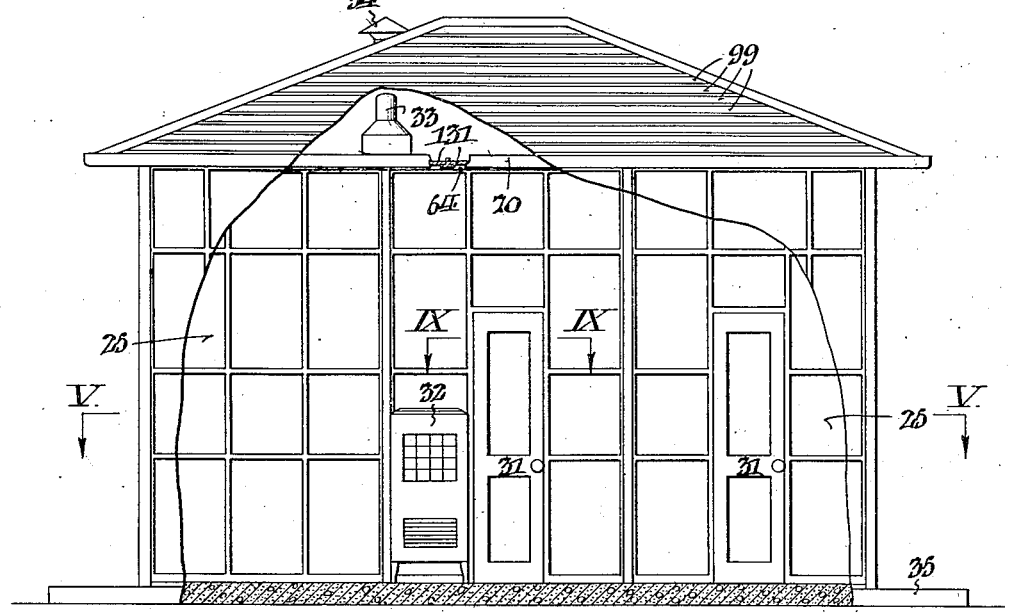
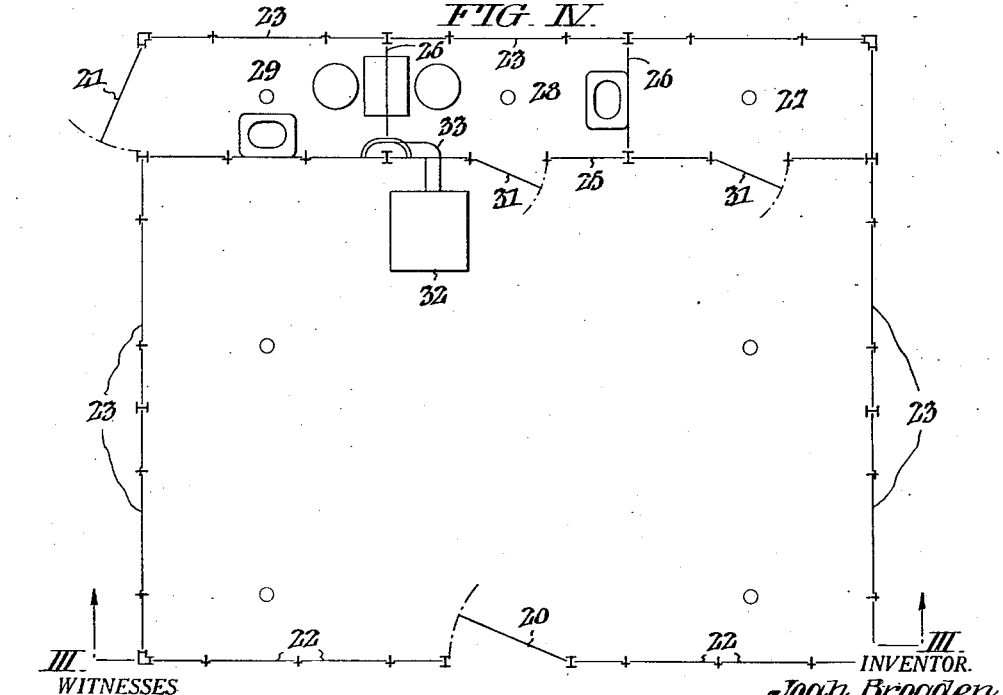

June 19, 1934.  J. BROGDEN  1,963,774
BUILDING CONSTRUCTION
Filed June 27, 1931  8 Sheets-Sheet 3
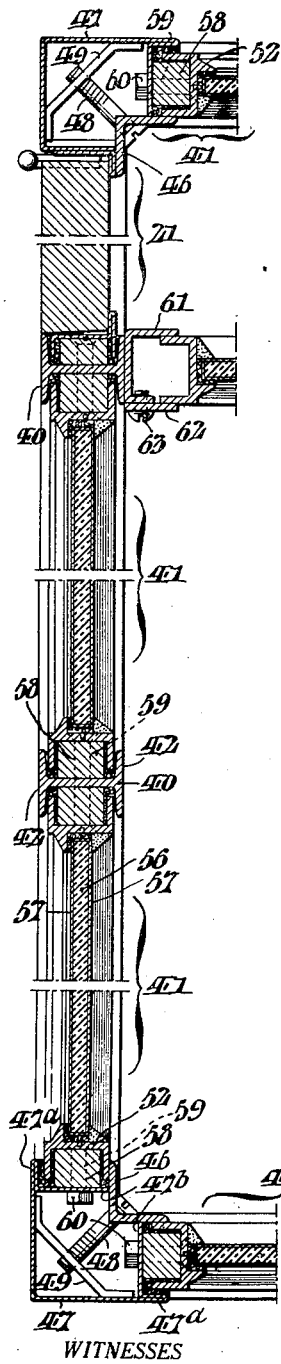
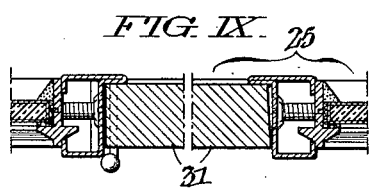
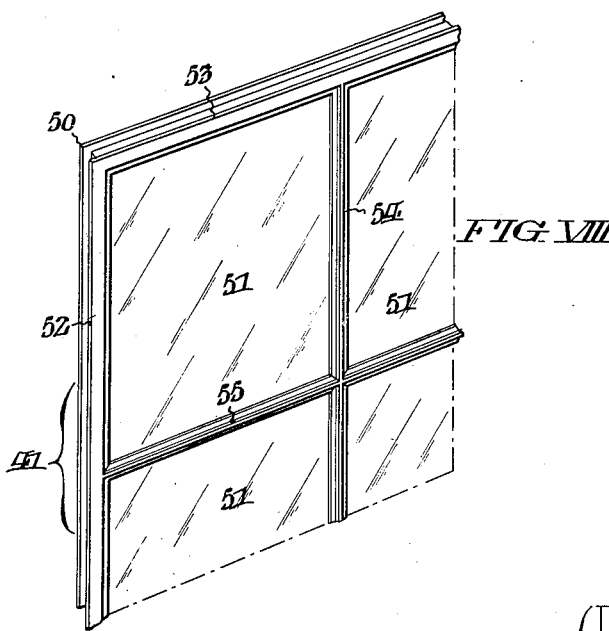
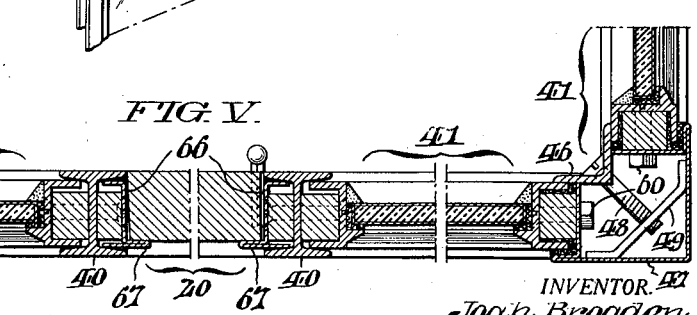

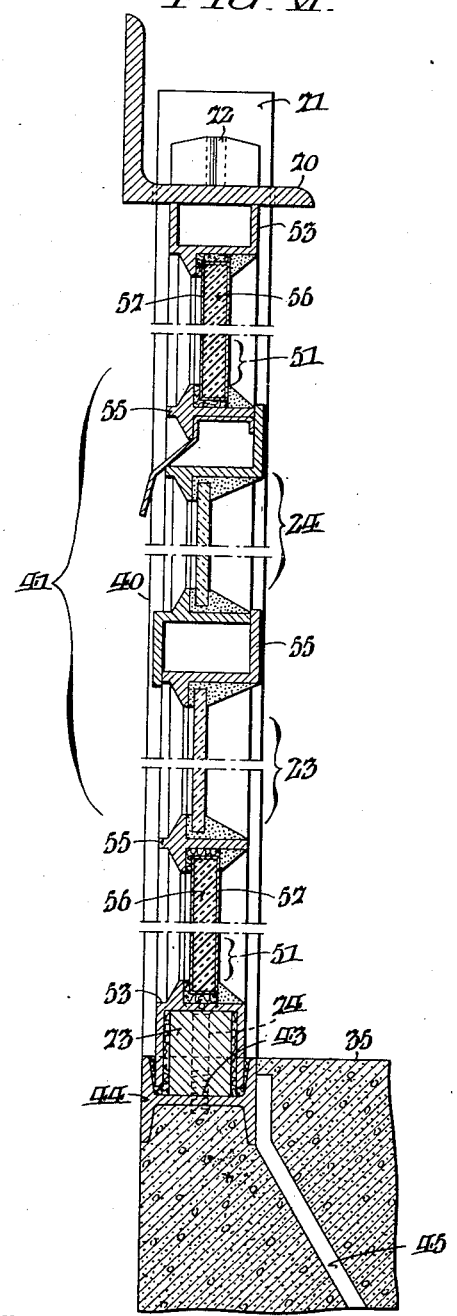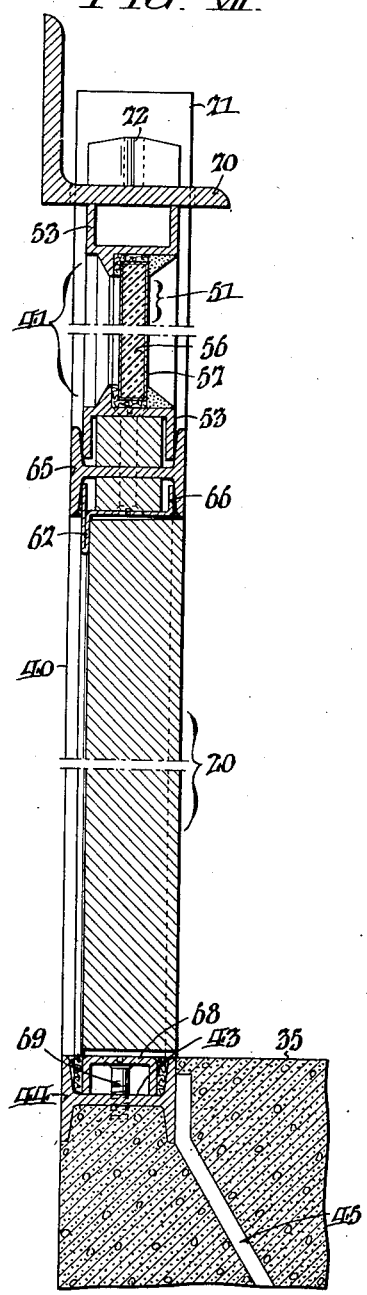

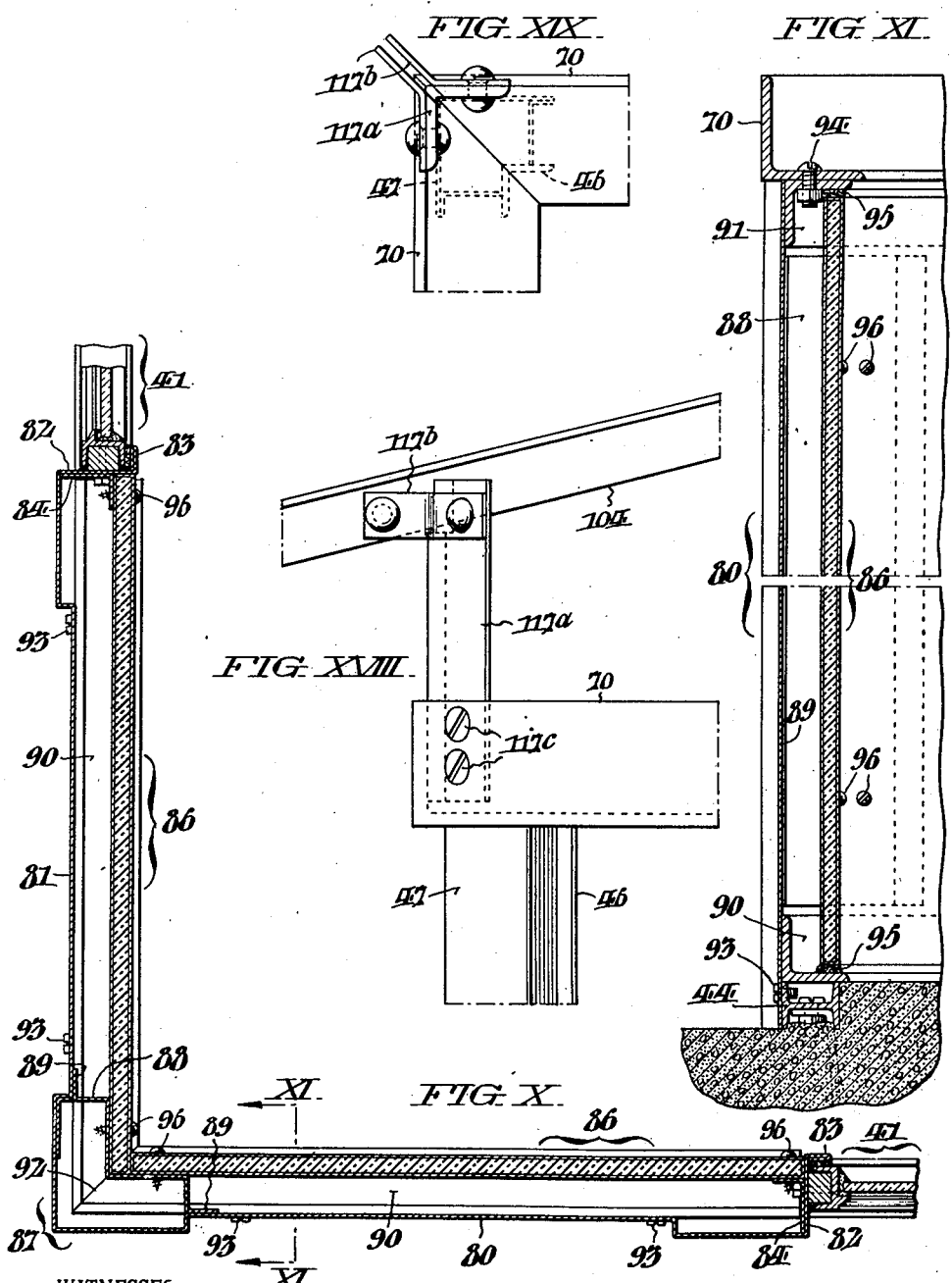

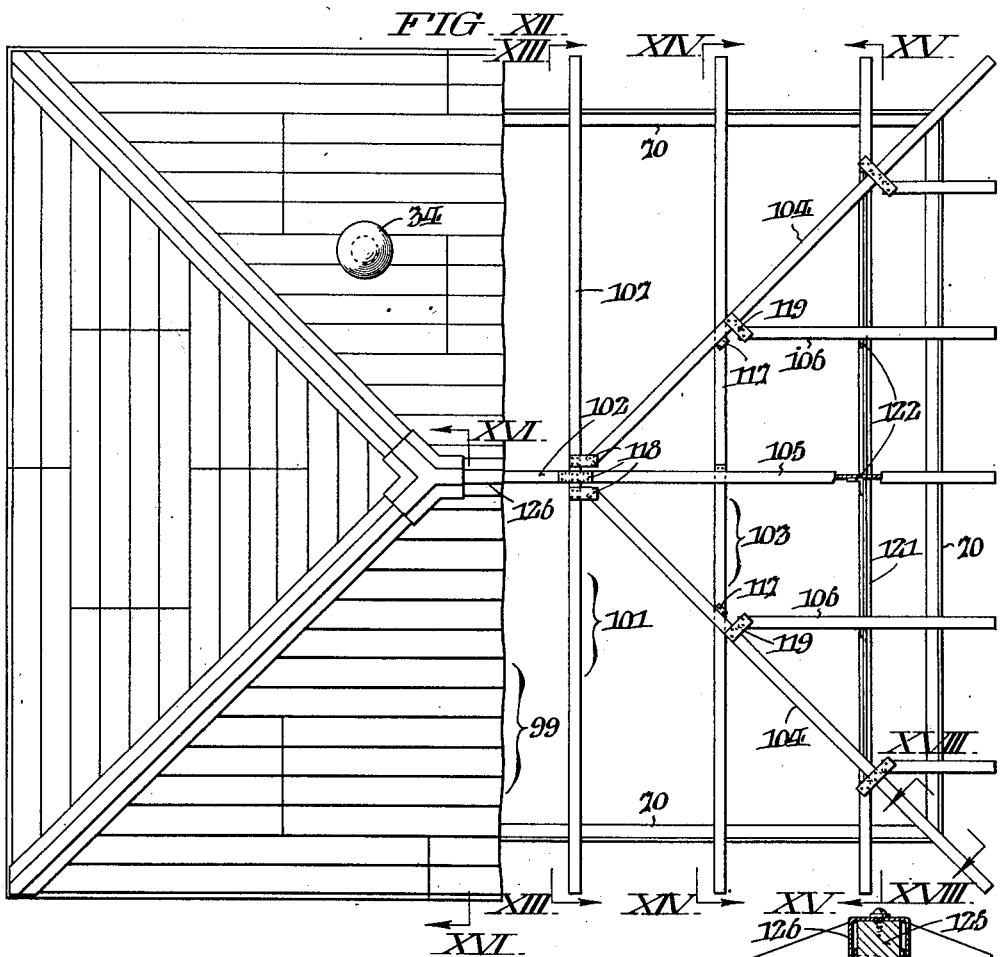
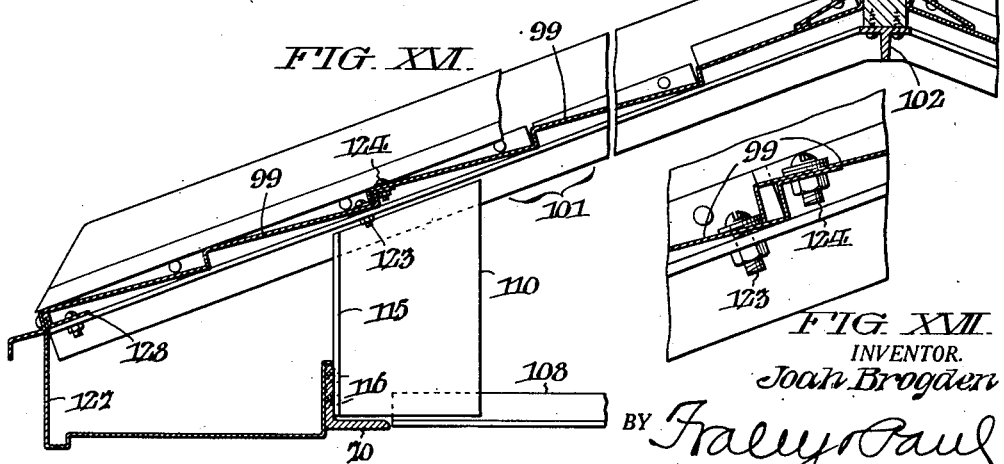

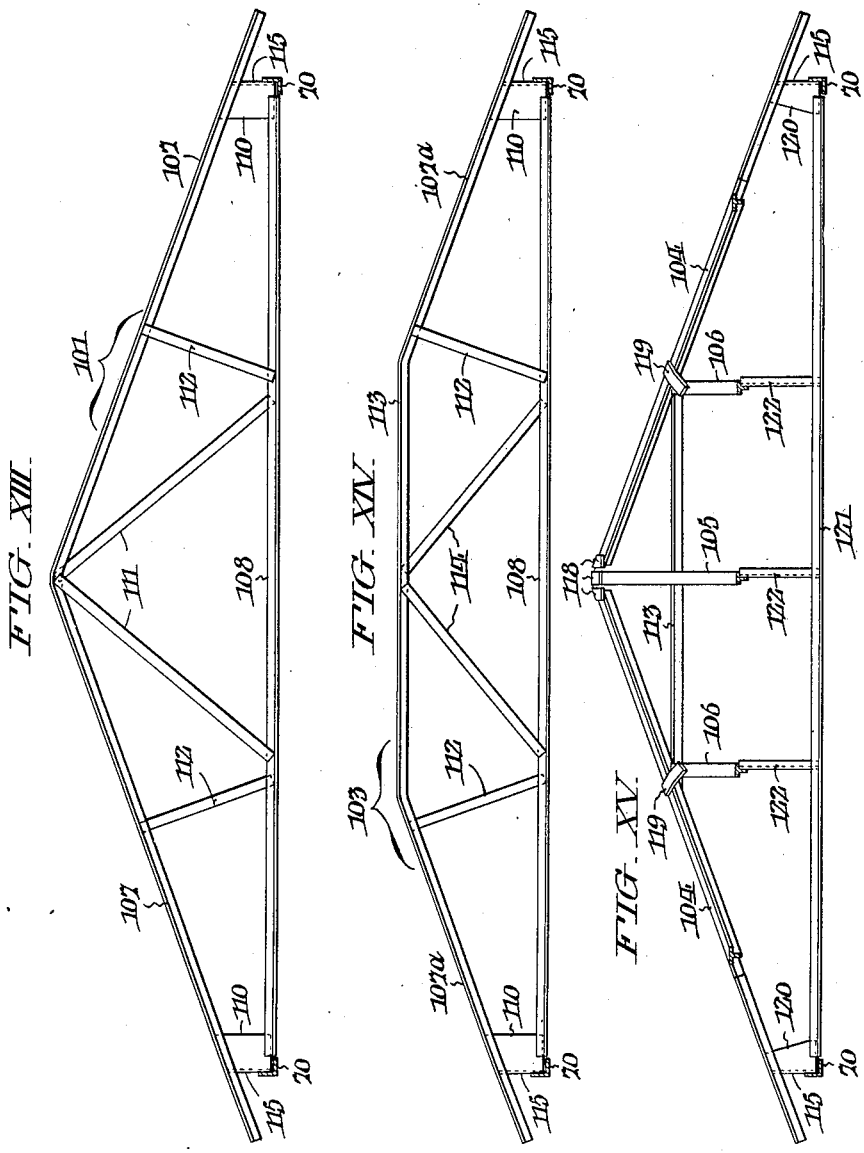

June 19, 1934.  J. BROGDEN  1,963,774
BUILDING CONSTRUCTION
Filed June 27, 1931  8 Sheets-Sheet 8
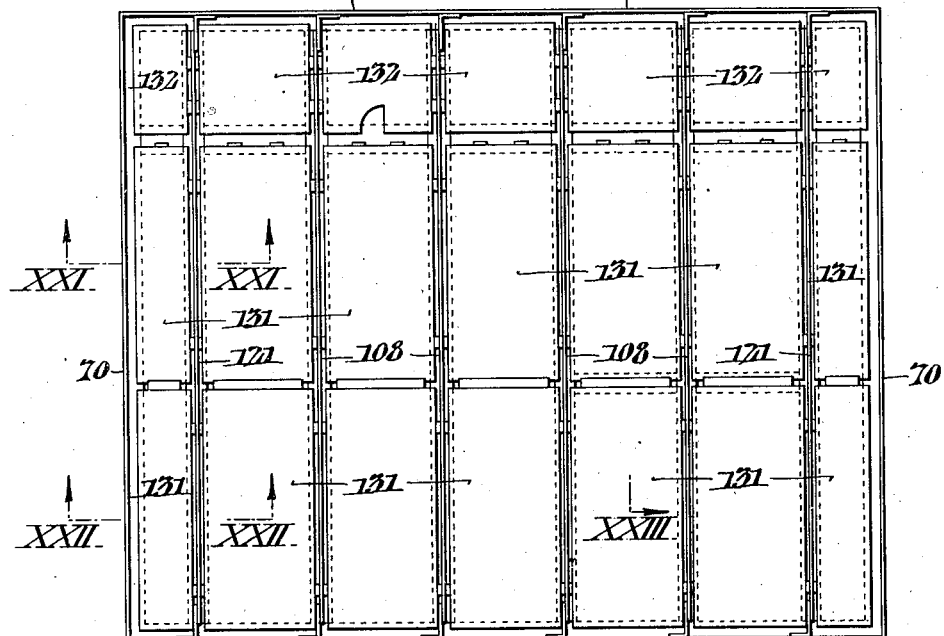
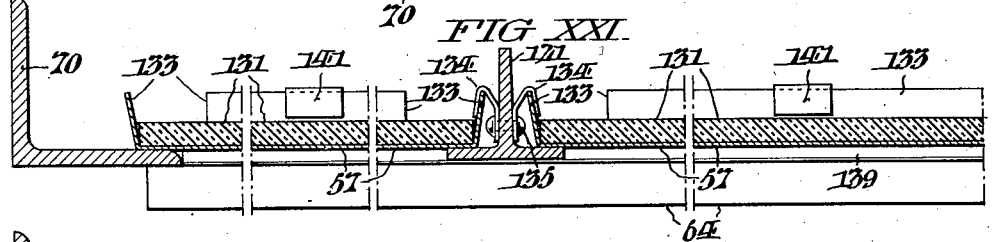
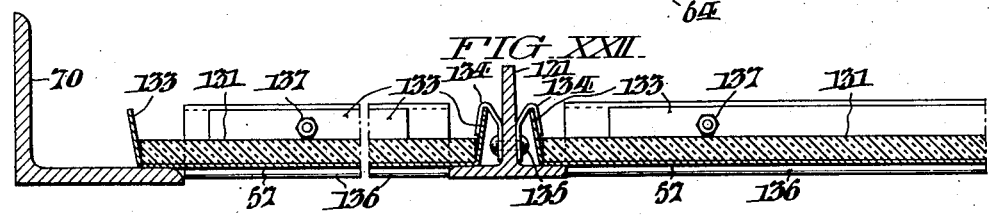
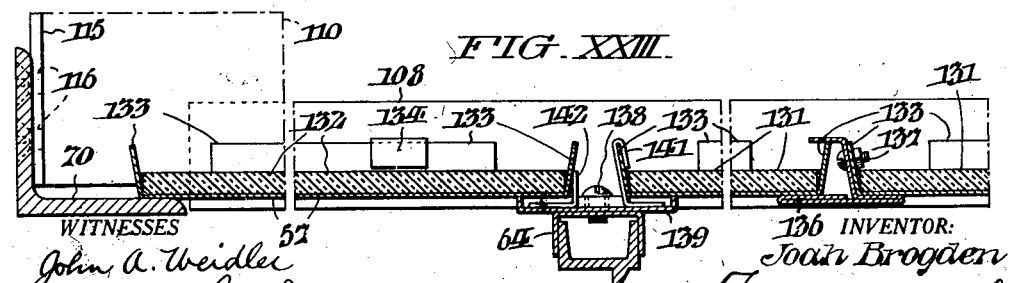

Patented June 19, 1934

1,963,774

UNITED STATES PATENT OFFICE 1,963,774

BUILDING CONSTRUCTION

Joah Brogden, Melrose Park, Pa.

Application June 27, 1931, Serial No. 547,217

11 Claims. (Cl. 189—2)

My invention relates to building construction, my aim being to provide a simple "knockdown" construction that can be rapidly and cheaply manufactured, conveniently shipped and transported, and easily and quickly erected, and can also be taken down and moved and re-erected,— all at relatively small cost. I also aim to secure a complete and satisfactory "finish", inside and out, by the mere process of erection (and painting if desired), without necessity for plastering, application of wall board, papering, or any other such measures. In suitable forms of construction, such as hereinafter described, my invention lends itself to variations in size of the building; gives a very pleasing appearance; and makes the building warm and easy to heat, owing to the thermo-insulative character of the walls, as well as to their tightness against wind and drafts.

The invention is readily adaptable and very advantageous for gasoline filling and service stations, and I have hereinafter illustrated and described and explained it as embodied in a building suitable for this purpose.

In the drawings, Fig. I is a front elevation of a building conveniently embodying my invention.

Fig. II is an end elevation from the left of Fig. I.

Fig. III is a front view with a portion of the front wall broken out to show internal features, and with the foundation and part of the ceiling in vertical section, as indicated by the line and arrows III—III in Fig. IV.

Fig. IV is a diagrammatic plan view of the interior of the building.

Fig. V shows a broken horizontal section through the front and side walls, taken as indicated by the line and arrows V—V in Fig. III.

Fig. VI shows a vertical section through the side wall at a window, taken as indicated by the line and arrows VI—VI in Fig. II, certain portions being broken out and omitted.

Fig. VII shows a vertical section through the front wall at the door, taken as indicated by the line and arrows VII—VII in Fig. I,—certain portions being again broken out and omitted.

Fig. VIII is a fragmentary perspective view of one of the wall panel units.

Fig. IX shows a fragmentary horizontal section through an inside partition and door, taken as indicated by the line and arrows IX—IX in Fig. III, a portion being broken out and omitted.

Fig. X is a horizontal section at a corner, illustrating a different corner construction from that of Fig. V.

Fig. XI is a fragmentary vertical section taken as indicated by the line and arrows XI—XI in Fig. X.

Fig. XII is a plan view of the roof, the covering being removed from the right-hand half to reveal the rafter construction.

Fig. XIII is a side elevation of one of the roof trusses, taken as indicated by the line and arrows XIII—XIII in Fig. XII.

Fig. XIV is a side elevation of another roof truss, taken as indicated by the line and arrows XIV—XIV in Fig. XII.

Fig. XV is an end view of the rafter construction of the roof, with certain parts in vertical section as indicated by the line and arrows XV—XV in Fig. XII.

Fig. XVI is a fragmentary vertical section through one side of the roof, taken as indicated by the line and arrows XVI—XVI in Fig. XII.

Fig. XVII is a fragmentary vertical section of certain parts similar to Fig. XVI, but on a larger scale.

Fig. XVIII is a fragmentary elevation, taken as indicated by the line and arrows XVIII—XVIII in Fig. XII, illustrating the roof framing at a corner.

Fig. XIX is a corresponding plan view with the hip rafter omitted.

Fig. XX is a plan view of a ceiling construction.

Figs. XXI, XXII, and XXIII are fragmentary sectional views through the ceiling, taken as indicated by the lines and arrows XXI—XXI, XXII—XXII, and XXIII—XXIII in Fig. XX.

In Figs. I, II, III and IV, the invention is shown as embodied in a rectangular building, slightly oblong in plan, with a hip roof. There is a door 20 in the middle of the front side, and another door 21 in the left-hand side, at the rear corner. The front has large windows 22, 22 that can be used as show windows, if desired, and there are other windows 23 in the end and rear walls, preferably provided with movable sashes 24 in their upper portions (Fig. II). Across the rear of the building is a partition 25, parallel with the front wall. Partitions 26 parallel with the end walls divide the space behind the partition 25 into three compartments or small rooms, one of which, 27, may conveniently be used as a store room, and the other two, 28 and 29, as lavatories. As shown, there are doors 31, 31 in the partition 25 affording access to the store room 27 and lavatory 28. The other lavatory 29 is accessible from the outside through the door 21, already mentioned. In front of the partition 25 is shown a heating stove 32, with a smoke pipe 33 extending back through the partition 25 and up through the roof to a hood 34.

The building may be conveniently erected on a concrete base or platform 35, which affords a floor and a foundation, and also a walk around the building. As shown in Figs. I, II, V, VI and VII, the outside wall of the building consists of a series of metal uprights or studs 40, of I-bar section, and intervening panel units 41 whose margins or edges are engaged between the flanges 42 of the uprights 40. The lower edges of the panel units 41 are engaged in a groove in the base 35, preferably of metal channel formation, and the uprights 40 also extend down to and engage the base or sill. As shown in Figs. VI and VII, this groove 43 lies between the upper flanges of a metal I-bar sill 44 set into the concrete base 35 (while the latter is soft) substantially flush with its top surface, and having its lower flanges completely embedded in the concrete. This channel member 44 may be additionally secured by means of anchor bars 45 welded or otherwise secured to the inner head of the I-bar 44 and extending downward and rearward in the concrete, and completely embedded therein.

At each corner of the building, (Fig. V), the edges of the panel units 41 are engaged between corresponding flanges of inner and outer angle uprights 46, 47, which are secured together by screws 48 extending through holes in the angles of the bars 46 and taking into threaded holes in diagonal braces 49 welded or otherwise secured across the inner corners of the angles 47. The angles 47 are shown as of sheet metal, doubled inward at 47a and then bent outward at right angles to form flanges 47b that engage against the flanges of the angles 46. Thus the angles 46, 47 together form a hollow post with channelled edges to take the edges of the panel units 41.

As shown in Fig. VIII, each panel unit 41 comprises a grid-like frame 50 of intersecting sash sections with a plurality of rabbeted "pane" openings amongst them, and sheets or panels 51 seated and secured in said openings, and swaybracing the frame against angular distortion in its own plane. The outside stiles 52 and rails 53 are channels with bevelled ribs on their backs to form the pane seats. The intermediate vertical and horizontal mullions 54, 55 are of T-section; or, around the openings for the swinging sashes 24, of Z-section. The mullions 54, 55 are dowelled and welded together and to the stiles 52, 53 as usual in metal sash construction. The panels 51 consist of plain sheets 56 of thermo-insulative fiber (or asbestos) faced with sheet metal 57. They may be secured in their rabbeted seats in the frame by putty, in the usual manner, just like the glass panes of the windows 22, 23. As shown in Figs. I and II, there are panels 51 all around each of the windows 22, 23, so as to make the panel units 41 perfectly rigid independently of the glass. The panel frames are preferably assembled complete at the factory and shipped without glass or panels 51, and set up on the job in this condition. This obviates risk of damage in transit and reduces the weight to be handled in erection. After the whole building has been set up, all the panels 51 and the glass can be inserted and puttied in.

As shown in Fig. V, there are wooden packing strips 58 in the channels of the panel stiles 52, secured by screws 59 extending through the stiles 52 and strips 58, and taking into threaded holes in the webs of the studs 40. At the corners, the screws 59 extend through the flanges 47b of the outer angles 47 and take into nuts 60 suitably fastened to these flanges. Putty, bitumen, or other calking material may be employed in the joints between the flanges of the stiles 52 and parts 40, 58, etc., to make them weather and draught-tight.

The partition 25 may be built exactly like the outside walls. As shown in Fig. V, the wall I-studs 40 at the ends of the partition 25 have channels 61 with unequal flanges welded (or otherwise secured) to their inner beads, and cover strips 62 are removably secured to their short flanges by screws 63, with the edges of the corresponding panels 41 engaged between said cover strips and the long flanges of the channels 61. An I or channel cap or cornice 64 (Figs. III and XXIII) may be mounted along the top of the partition 25, in about the same way as the wall cap plate hereinafter described.

At the doors 20 and 21, horizontal I members 65 and channel-like jambs and heads 66 of sheet metal may be provided with weathering stops 67 (Fig. VII). At the partition doors 31, 31, the jambs and head are similar,—these doors being included in the panels 41, 41 of the partition 25. At the door-ways 20, 21, 31, 31, fillers 68 are secured in the groove 43 by screws 69 taking into the web of the member 44, to form suitable door sills, and the cracks are filled with putty, bitumen, or other cement.

A cap plate 70, of angle bar section, extends along over the upper edges of the panel units 41, and is secured to the upper ends of the uprights 40. As shown in Figs. III, VI and VII, the angle bar 70 is arranged with one flange horizontal and the other flange extending upward at the outside of the uprights 40. The upper ends of the uprights 40 are provided with flat tongues 71 (formed by cutting away the flanges of the I-section) which extend through corresponding transverse slots in the cap plate 70 and are secured by wedges or keys 72 of doubled sheet metal inserted in longitudinal slots in said tongues 71, with their ends bent apart. As shown in Fig. VI, wooden packing strips 73 of somewhat less thickness than the width of the panel grooves of the bottom members of the panel units 41 are secured in the channel grooves 43 by screws 74 taking into threaded holes in the web of the member 44. When the panel units 41 are put in place, the grooves of their lower channel rails 53 are partly filled with bituminous cement, putty, or other semi-soft material. When the screws 74 are tightened up, this soft matter is squeezed down around the edges of the flanges of the channel 53 and up outside them. The wedges 72, when driven home, assure a snug fit between the cap plate 70 and the top rails 53 of the panel units 41, thus assuring a tight joint at this point.

In setting up the walls, a start is made by setting up the uprights 46, 47 and the adjacent panel units 41, 41 at a corner. The wall is then continued both ways by setting up successive uprights 40 and panel units 41. After the initial corner is once set up, a single man can complete the work.

Figs. X and XI illustrate an alternative corner construction that can be set up by one man without assistance. Here the corner uprights 46, 47 and adjacent panel units 41 of Fig. V are replaced by a corner unit of sheet-metal construction, which is self-supporting when set up. This unit comprises two panels 80, 81 of sheet metal, each having one margin bent to form an outstanding pilaster 82, with an outstanding "wing"

flange 83 to seat the edge of an adjacent panel unit 41. An angle 84 secured to the inside of each pilaster 82 affords a seat for a corresponding interior metal-sheathed panel 86 similar in structure to the panels 51. At the corner, the panel 80 is bent to form the entire corner pilaster 87, and the margin of the panel 81 is offset to fit into it,—as shown in Fig. X. An internal corner piece 88 of sheet metal (which affords a seat for the edges of the panels 86) has outstanding wing flanges 89 one of which is welded or otherwise secured to the inner face of the panel 81, while the other fits against the inner face of the panel 80. A horizontal angle bar 90 is welded or otherwise secured across each panel 80, 81 near its lower edge, and another angle 91 is similarly secured across each panel along its upper edge. These angle bars 90, 91 have their ends bevelled at 92 to mate properly inside the corner pilaster 87.

The corner panels 80, 81 may be shipped separately and fitted together into a unit on the job, before or in setting them up. After they have been set on the base with their angles 90, 90 resting on the sills 44, 44, their lower edges may be fastened to the sill flanges by screws 93, as shown in Figs. X and XI. After the cap plate 70 is put in place, the upper ends of the panels 80, 81 may be secured thereto by bolts 94 through the panel angles 91 (Fig. XI). The panels 86 may be put in place with suitable packing 95 on their upper and lower edges (to make the joints tight), and secured by screws 96 taking into the panel flanges 84 and the corner piece 88. When thus in place, the panels 86 "sway-brace" the panels 80, 81 (and brace the whole corner) by their edge engagement inside the inward extending marginal portions 82, 88, 90, 91 of the panels.

The hip roof shown in Figs. XII to XIX comprises a sheet metal covering 99 laid on a frame comprising transverse triangular trusses 101 associated with the ridge 102, and in each end (beyond the ridge) a transverse trapezoidal truss 103, hip rafters 104, an end rafter 105, and jack rafters 106. Each triangular truss 101 comprises rafters 107 formed of a T-bar bent at the peak, a T-bar tie 108 with its ends secured to gussets 110, themselves secured to the rafters 107, diagonal angle bar ties 111 from the peak to the tie 108, and angle bar struts 112 from the tie 108 at the ties 111 to the rafters 107. The trapezoidal truss 103 differs from the triangular truss 101 in having its rafters 107a shorter, with an upper chord 113 extending between their ends at the struts 112, and in that the ties 114 are shorter than the ties 111, since they extend from the lower chord tie 108 to the middle of the upper chord 113. As shown in Fig. XIV, the rafters 107a and the upper chord 113 are formed by a T-bar suitably bent. As shown in Figs. XIII—XVI, the trusses 101, 103 rest on the cap plates 70 at the gussets 110 with the rafters 107, 107a projecting over to support the eaves of the roof, and are secured by lateral flanges 115 on the gussets which are riveted to the upstanding plate flange at 116. The hip rafters 104 extend over the trusses 103 about at their upper angles, where they are secured to them by angle clips 117. They project over the corners of the building, where they are supported by angle bar uprights or feet 117a, (Figs. XVIII and XIX) which are secured to them by angle clips 117b and are slotted at their upper ends to accommodate the upright flanges of the hip rafters 104. The lower ends of the feet 117a rest in the angles between the upright flanges of the cap plates 70, 70, and may be secured to the latter by screws 117c. The end rafter 105 extends over the middle of the truss 103, and may be secured thereto by angle clips. The upper ends of the rafters 104, 104, 105 are secured to the rafters 107, 107 and the ridge 102 by clip plates 118, and the upper ends of the jack rafters 106 are secured to the hip rafters 104 by clip plates 119. Where the rafters 105, 106 (all of T-section) extend over the plate 70 to carry the eaves, they are supported and secured by gussets plates 120 (Fig. XV) similar to the gussets 110. As shown in Figs. XII and XV, ties 121 (similar to the ties 108) connect the opposite side gussets 120; they are supported at intermediate points by angle bar ties 122 whose upper ends are attached to the end rafter 105 and the adjacent jack rafters 106, 106.

As shown in Figs. I, II, III, XII, XVI and XVII, the sheet metal roof covering 99 consists of strips offset longitudinally in imitation of overlapping shingles, and to strengthen them. These strips are laid directly on the trusses 101, 103 and rafters 104, 105, 106, and secured to them by bolts 123 through the T head flanges. At the longitudinal joints, the bent edge of one strip overlies the Z-offset edge of that below and is secured thereto by a bolt 124. On top of the T-bar ridge 102 is mounted a wooden ridge 125 to which the upturned edges of the adjacent roofing strips are fastened, and over this ridge 125 is secured a trough-like sheet metal cover 126 with flaring margins. The hips are similarly protected. Under the eaves is a sheet metal molding 127 whose upper margin has an inturned flange 128 bolted to the ends of the rafters 107, 107a, 105, 106, and whose inner margin has an upturned and inturned flange engaging the upstanding flange of the wall plate 70.

As shown in Figs. III and XX–XXIII, there is a ceiling consisting of sheets or panels 131, 132 (somewhat similar to the wall sheets 51) resting at their edges on the T flanges of the ties 108, 121, and on the plate 70. As shown, there are two rows of panels 131, laid end to end, in front of the partition 25, and a single row of shorter panels 132 behind the partition. In the present instance, however, the panels 131, 132 have metal sheathing 57 only on their lower sides, and the margins 133 of this sheathing are flanged and project up between and along adjacent members 108, 121, and 70. The flanges 133 along the members 108, 121, are engaged by the bent down hooked ends of sheet metal clips 134 riveted or otherwise secured to the members 108, 121, at 135, so that these clips hold the panels 131, 132 securely in place. Between the adjacent edges of the rows of panels 131 cover members 136 of T section are engaged, extending from one chord or member 108, 121, 70 to the next so as to give the ceiling panelling an inset effect, besides concealing the corresponding joints. These members 136 may be formed of sheet metal suitably bent, and may be secured to one of the adjacent ceiling panel flanges 133 by bolts 137 (Figs. XXII and XXIII); as shown in Fig. XXIII, their upstanding T flanges have their margins bent over horizontally across the edges of the other flanges 133. As shown in Fig. XXIII, the channel cap 64 of the partition 25 is secured by bolts 138 to a shallow upturned channel plate 139 provided with angle clips 141, 142 (welded or otherwise secured thereto) to engage the edges of the panels 131, 132. The ends of the clips 141 are shown bent down on the flanges 133 of the panels 131 to secure them.

In practice, one, at least, of the panels 132 (or 131) may be left altogether unsecured, to afford access to the space above the ceiling if desired.

Having thus described my invention, I claim:

1. A knockdown building construction comprising a wall formed, with outside and inside finish, by a series of metal I-studs with intervening panels, each panel embodying a surrounding frame of outwardly-facing channel-sections with their edges engaged in the side hollows of said I-studs, and packing strips intermediate the adjoining frame edges and I-studs and secured to the webs of the latter.

2. A knockdown building wall construction comprising, in combination with an upward-facing sill channel, a wall formed with outside and inside finish by a plurality of metal I-studs and wall panels, said panels embodying outwardly-facing channel-section frames engaged in the sill channel and in the side hollows of adjoining I-studs; and suitable packing strips intermediate the panel edges, I-studs and sill channel, said packing strips being secured to the web portions of the I-studs and the sill channel.

3. A knockdown building wall construction comprising an upward-facing sill channel, metal I-studs for said wall, wall panels embodying outwardly-facing channel-section frames with their edges engaged in the sill channel and in the side hollows of said I-studs, packing strips surrounding the wall panels and secured to the I-stud and sill channel webs, and a cap plate extending along over the tops of said wall panels and secured to the upper ends of said I-studs.

4. A knockdown building construction comprising a sill with an upward-facing metal channel, a series of metal I-studs with their lower ends engaging said sill and with tongues on their upper ends, intervening panels embodying outwardly-facing channel-section stiles and rails with their edges engaged in said sill channel and in the side hollows of said I-studs, packing strips surrounding the panel edge hollows and secured to the I-stud and sill channel web portions, and an apertured cap plate extending along over the tops of said panels and having the upper end tongues of said I-studs engaged in its apertures.

5. A wall construction comprising a concrete base, a metal I-member with its flanges at one side embedded in the concrete, anchorage means attached to said I-member and extending downward into the concrete, a series of metal I-studs with their lower ends engaging said I-member, and intervening panels embodying outwardly-facing channel-section stiles and rails with their edges engaged in the side hollows of said I-member and I-studs, and forming with the latter the entire wall, complete with outside and inside finish.

6. A knockdown building construction comprising a wall formed, with inside and outside finish, by a series of metal I-studs and intervening metal-framed panels with their edge members engaged in the side hollows of said I-studs, said panels each consisting of a grid-like structure of intersecting metal sash sections combined to form a sash frame with a plurality of rabbeted pane-openings amongst them, the outside stiles and rails of said frames being of outwardly-facing channel-sections with beveled ribs on their backs, and thermo-insulative sheets seated and secured in said openings against the beveled ribs, and thus sway-bracing the sash frame and the entire wall.

7. A knockdown building corner construction comprising metal I-studs in the intersecting building sides, panels embodying outwardly-facing channel-section stiles and rails having edges engaged in the side hollows of said I-studs and extending from them substantially to the corner, inner and outer angle uprights at the corner with the adjacent channel-section edges of said panels between their corresponding flanges, and means for securing said angle uprights together.

8. A knockdown building corner construction comprising metal I-studs in the intersecting building sides, wall panels embodying outwardly-facing channel-section stiles and rails having edges engaged in the side hollows of said I-studs, and a corner unit comprising interconnected sheet metal corner panels in the intersecting sides engaging and securing the edges of the adjacent panels first mentioned.

9. A knockdown building corner construction comprising, in combination with upward-facing sill-channels for the intersecting walls, metal I-studs for said walls, wall panels embodying outwardly-facing channel-section stiles and rails with their edges engaged in the sill channels and in the side hollows of said I-studs, a corner unit comprising interconnected sheet metal corner panels in the intersecting walls secured to the corresponding sills, and cap plates for said walls secured to the upper ends of said I-studs and corner panels.

10. A knockdown building corner construction comprising interconnected sheet metal corner panels with inward extending margins, interior panels embodying outwardly-facing channel-section stiles and rails seated and secured inside the margins of said sheet metal panels and thus sway-bracing them and bracing the corner.

11. In a knockdown building construction, walls formed complete, with outside and inside finish, by a series of metal I-studs and intervening panels embodying outwardly-facing surrounding channel-sections with their edges engaged in the side hollows of said I-studs, and an angle cap plate for each wall having one flange secured to the tops of said I-studs and the other flange turned outward and upward.

JOAH BROGDEN.